United States Patent [19]

Mason et al.

[11] Patent Number: 5,486,369

[45] Date of Patent: Jan. 23, 1996

[54] PROCESS FOR PREPARING SHELF-STABLE, INTERMEDIATE-MOISTURE POTATOES

[75] Inventors: Charles R. Mason, Yonkers; Dalip K. Nayyar, Washingtonville, both of N.Y.; Edward C. Coleman, New Fairfield, Conn.

[73] Assignee: Kraft Foods, Inc., Northfield, Ill.

[21] Appl. No.: 376,311

[22] Filed: Jan. 20, 1995

[51] Int. Cl.$^6$ ............................................. A23L 1/217
[52] U.S. Cl. ........................ 426/321; 426/438; 426/441; 426/637
[58] Field of Search ................................. 426/438, 441, 426/637, 302, 321

[56] References Cited

U.S. PATENT DOCUMENTS

| | | | |
|---|---|---|---|
| 2,498,024 | 2/1950 | Baxter | 426/637 X |
| 3,881,028 | 4/1975 | Capossela, Jr. et al. | 426/242 |
| 4,389,424 | 6/1983 | Hasegawa | 426/546 |
| 4,390,550 | 6/1983 | Kahn et al. | 426/102 |
| 4,447,459 | 5/1984 | Balboni et al. | 426/441 |
| 4,542,030 | 9/1985 | Haury et al. | 426/262 |
| 4,579,743 | 4/1986 | Hullah | 426/262 |
| 4,632,838 | 12/1986 | Doenges | 426/441 |
| 4,751,093 | 6/1988 | Hong et al. | 426/438 |
| 4,761,297 | 8/1988 | Sugisawa et al. | 426/618 |
| 5,059,435 | 10/1991 | Sloan et al. | 426/637 X |
| 5,084,291 | 1/1992 | Burrows et al. | 426/637 X |
| 5,302,410 | 4/1994 | Calder et al. | 426/438 X |

FOREIGN PATENT DOCUMENTS

| | | | |
|---|---|---|---|
| 2104370 | 2/1983 | United Kingdom | 426/637 |

*Primary Examiner*—Arthur L. Corbin
*Attorney, Agent, or Firm*—Thomas R. Savoie; Thomas A. Marcoux

[57] ABSTRACT

Shelf-stable, intermediate-moisture potatoes are produced by blanching strips of raw potatoes in a heated infusion solution containing sugar and sodium chloride, draining and cooling the infused potato strips and drying the infused potato strips such that the strips have a water activity of below 0.85%. In one embodiment, blanching is performed by soaking the strips in an infusion solution from 1 to 3 minutes at a temperature of at least 200° F. where the solution contains at least 5% sodium chloride and at least 12% sucrose.

4 Claims, No Drawings

PROCESS FOR PREPARING SHELF-STABLE, INTERMEDIATE-MOISTURE POTATOES

BACKGROUND OF THE INVENTION

1. Field of the Invention

The present invention relates to the preparation of potatoes, and more specifically, the preparation of intermediate-moisture potatoes that may be stored on the shelf for extensive time periods without the need for refrigeration.

It is well known in the prior art that potatoes may be dehydrated, but extensive problems have resulted in producing a final product that has high quality from consumer considerations. Flavor loss from the processing steps has caused lower quality than is desired. Additionally, storage of the dehydrated product may necessitate specific conditions such as refrigeration, including freezing. Upon rehydration, non-uniform water absorption in the product may result which also lowers product quality.

A recent development in the food industry is the emphasis on intermediate-moisture foods which have the ability of being stored and marketed in a substantially non-refrigerated condition. These foods were designed to avoid the need to be packaged in a hermetically sealed container and commercially sterilized or maintained in a frozen or refrigerated state throughout the period of distribution and storage by the consumer.

The intermediate-moisture foods are based on the principle of reducing the availability of water in the food for microbial growth. The availability of water for the germination and microbial growth is closely related to its relative vapor pressure, commonly designated as water activity. It was found that the use of a wide variety of water-soluble solutes, or osmotic agents, has the effect of depressing the water activity of the foods to levels at which most bacteria will not grow.

The water activity of a food is defined as the partial pressure of water in the food divided by the saturation pressure of water at the temperature of the food. The water activity can be determined by placing a sample in a container which is then sealed, and after equilibrium is reached, determining the relative humidity above the sample. Most products of the intermediate-moisture type have between 10 to 40% moisture, and a water activity between 0.65 and 0.9.

2. Discussion of the Prior Art

U.S. Pat. No. 4,390,550 is directed to intermediate-moisture foods that are frozen for long term preservation and which remain shelf-stable for a long period after thawing. The foods are prepared with a sugar/water ratio of 1:1 which reduces the water activity to between 0.75 to 0.93, preferably between 0.80 and 0.90. The sugar is employed as the principal source of water-soluble solutes in a range of 30% to 60% of the composition. Other non-sugar, water-soluble solutes may also be included with the sugar, such as sodium chloride, potassium chloride, glycerol, propylene glycol and the like. The method of making these foods include blending 15 to 45% water, sugar in a sugar/water ratio of 2–1:1, 2.5 to 30% fat and minor amounts of salt, emulsifier, stabilizer and flavoring, provided that the solubles are adequate to provide a water activity of 0.8 to 0.9, pasteurizing the mixture and cooling the resultant products. The pasteurizing is performed by heating and holding the mixture at 180° F. for 5 minutes. The mixture is then homogenized, packaged and frozen. In one example, fruit is added to the mixture. The fruit is first infused with sugar solutes to reduce its water activity to 0.45 to 0.65. Infusion is achieved by placing the fruit in a hot bath of fructose-containing syrup at about 220° F. to 225° F. for about 5 minutes. Although disclosed as being useful for many diverse foods, there is no disclosure of a process for making shelf-stable potatoes or other starch-based foods.

U.S. Pat. No. 3,881,028 is directed to a method for preparing intermediate-moisture, shelf-stable potatoes that includes preparing strips of potatoes, blanching the potatoes at about 212° F., thereafter soaking the blanched potatoes in a heated (180° F.) salt solution, such as a 1.5% sodium chloride solution, drying by microwave heating for 45 seconds, frying in oil at 350° F. for 6 minutes and drying in a microwave for 75 seconds. The shelf-stable potatoes are reconstituted by soaking in tap water at 140° F. for 10 minutes and then heated in an oven at 425° F. for 7 minutes. The salt dip is employed to remove surface starch to reduce non-uniformity caused by the blanching.

U.S. Pat. No. 4,751,093 discloses a process for preparing french fries for freezing that includes infusing low molecular weight soluble solids, such as 2%–20% sodium chloride, simultaneously with blanching at about 200–205° F. for 8 minutes, drying at up to 200° F., frying in oil at about 350° F. for 1 minute and freezing.

There is a need for a fast and simple process for preparing shelf-stable intermediate-moisture potatoes without case hardening that when reconstituted and cooked have firm texture and excellent flavor.

SUMMARY OF THE INVENTION

The present invention is directed to a method for preparing shelf-stable, intermediate-moisture potatoes suitable for reconstitution that includes first preparing pieces of raw potatoes for processing and then blanching the raw potato pieces in a heated infusion solution containing one or more sugars and sodium chloride to infuse sugar and sodium chloride into the potato pieces. The pieces are then drained and cooled and thereafter dried resulting in potato pieces having a water activity of below 0.85. The blanching step includes soaking the raw potato pieces in the infusion solution for from 1 to 3 minutes at a temperature of at least 200° F. (93.3° C.). The infusion solution contains at least 5% sodium chloride and at least 20% sugars. The potato pieces are dried by subjecting the pieces to heat for a sufficient time and temperature to reduce the water activity of the pieces to below 0.85. The pieces may then be packaged in moisture-impermeable packaging, material, but no special packaging, such as vacuum sealing or sterilization, is required. In addition, no refrigeration or freezing is necessary.

In accordance with one aspect of the present invention, the ratio and amount of sugars and sodium chloride is adjusted to reduce the water activity of the strips to below 0.85 upon blanching. The drying step then further reduces the water activity well below 0.85.

The sugar is selected from the group consisting of sucrose, dextrose and fructose and combinations thereof. The preferred sugar is sucrose. In addition, prior to blanching the pieces may optionally be soaked in a solution containing at least 0.1% sodium pyrophosphate to prevent browning.

The drying step may be performed in conventional ovens of various types, at a temperature of 200° F. for at least 1 minute. The frying step is typically performed in oil for at least 30 seconds at a temperature of at least 350° F. (176.7° C.). A batter coating may be applied to the pieces prior to frying.

The use of sugar and sodium chloride in the heated infusion solution results in an accelerated infusion process producing shelf-stable, intermediate-moisture potatoes that may be stored for long periods of time without the need for refrigeration or other storing means. When reconstituted, by conventional methods and preferably by microwave heating, the potatoes have an excellent firm texture and flavor. The sugar and sodium chloride combination penetrate the potatoes, lowering the water activity and leaving the potatoes resilient to case hardening during drying. Other known humectants that can also be included together with the sugar and sodium chloride combination include propylene glycol, glycerol, potassium chloride, sodium nitrite, potassium sorbate, sorbitol and propylparaben. These additional humectants may each be contained in the solution at a level of in at least 0.1%.

All percents and ratios recited in the descriptions and claims of this invention are calculated on a weight basis.

DETAILED DESCRIPTION OF THE INVENTION

The present invention is directed to a method of preparing shelf-stable, intermediate-moisture potatoes that may be stored without the need for refrigeration or other means for long periods of time. The process of the present invention provides for an accelerated infusion of potatoes using aqueous solutions containing sugar and sodium chloride at elevated temperatures. The invention allows the potatoes to be continuously processed from a raw or uncooked state to a shelf-stable form in a very short time, i.e., in as little as 30–50 minutes, preferably 30–40 minutes.

The present invention introduces a flexible, intermediate-moisture potato without case hardening. Case hardening is a common problem encountered when drying starch based products and is normally overcome by drying at lower temperatures with high humidity for long periods of time. The accelerated infusion process of the present invention permits the potatoes to be dried quickly at higher temperatures using various drying methods to produce potatoes that when reconstituted have an excellent firm texture and flavor. The intermediate-moisture potatoes of the present invention may be stored without the need for refrigeration and do not need any special wrapping materials, although a moisture impermeable packaging is desired for extensive storage times to prevent water absorption from the atmosphere. The intermediate-moisture potatoes of the present invention are reconstituted by heating the potatoes in a microwave oven. No water or sauces are necessary, and it is preferred that none be used.

In accordance with the process of the present invention, whole potatoes are preferably peeled, washed and cut into strips or slices of french fries or steak fries. The raw potatoes are then blanched in an infusion solution containing sugar and sodium chloride. The infused potato strips are drained and cooled. The strips are dried and then fried resulting in an intermediate-moisture shelf-stable potato having a water activity of below 0.85. The infusion solution may contain various ratios of sugars and sodium chloride. In addition, the drying and frying steps are performed at various times and temperatures. These variables are adjusted such that the resultant potato strips have a water activity of below 0.85. The ratio of sugars to sodium chloride in the infusion solution of the present invention is in the range of about 1:1 to 5:1. Preferably, the ratio of sugar to sodium chloride is 2–3:1. The sugar used in the infusion solution of the present invention is selected from the group consisting of sucrose, dextrose, fructose and combinations thereof. One factor in the selection of the sugar will be the desirability for sweetness in the resulting potatoes. In a preferred embodiment of the present invention, the infusion solution contains at least 5% sodium chloride and at least 12% sucrose. Moreover, the range of sodium chloride is typically from 5% to 12% and the range of sugar is from about 12% to 30%.

The infusion solution of the present invention can be composed of the various ratios of sugars and sodium chloride alone or in combination with other known humectants such as propylene glycol, potassium chloride, glycerol, sodium nitrite, potassium sorbate, sorbitol and propylparabin. These additional humectants may be included at a level of at least 0.1% of the infusion solution.

Prior to blanching, the potatoes may be treated to prevent browning such as by soaking the raw strips in a solution containing at least 0.1% sodium pyrophosphate. Alternatively, the sodium pyrophosphate may be included in the infusion solution.

The blanching step is performed for at least one minute at a temperature of least 200° F. (93.3° C.). Preferably, the blanching is performed from between 1 to 3 minutes at about 212° F. (100° C.).

After the infused potato strips are drained and cooled, the strips are dried by conventional oven means. As is well known, in an oven the potato strips will be subjected to heated air by methods such as impingement, humidified or high velocity convection. The oven drying is performed for at least 1 minute at a temperature of at least 200° F. (93.3° C.). The frying is performed for at least 30 seconds at a temperature of at least 350° F. (176.7° C.), typically in oil. The combination of drying and frying achieves the optimum finished moisture (water activity below 0.85) and french fry texture (crisp exterior and soft interior). A batter coating may be applied to the potato strips prior to frying in oil.

Numerous humectants and combinations thereof were tested to determine their characteristics and performance in the infusion process. Sucrose and sodium chloride were determined to be the preferred combination for producing intermediate-moisture, shelf-stable french fries.

The use of sucrose in the french fry infusion process provides three benefits:

1. Performs as a humectant to replace water and lower water activity.

2. Allows rapid drying at either high or low temperatures without case hardening.

3. Provides a powdery/grainy/crispy surface compatible with a french fry potato.

To further illustrate the innovative aspects of the present invention, the following example is provided:

EXAMPLE 1

| Infusion Solution | Purpose | Quantity (Grams) | Percent |
| --- | --- | --- | --- |
| Water |  | 1,790 | 71.6 |
| Sucrose, Granular | Humectant | 500 | 20 |
| Sodium Chloride | Humectant | 200 | 8 |
| Sodium Pyrophosphate | Retard Browning | 5 | 0.2 |
| Potassium Sorbate | Mold Inhibitor | 5 | 0.2 |
| TOTAL |  | 2,500 | 100.0 |

PROCESS:

The infusion solution above was placed in a 4½ cup (1067 ml) sauce pan, placed on a conventional stove and heated to boil. Whole Russet baking potatoes were washed, peeled and sliced into a french fry form. The slices were placed in a soak solution, which contains a 0.2% level of sodium pyrophosphate (to retard browning). 250 Grams of the treated potato slices were blanched/infused in the boiling solution for 4 minutes. The cooked potatoes were then placed on screens and held at refrigerated temperatures (4°–10° C.) for 5 minutes to cool. The cooled potatoes were left on the screens, while drying in a Lincoln®impingement oven at 200° F. (93.3° C.) for 9 minutes, the resulting water activity (Aw) was 0.888. The dried potatoes were fried in a deep fat fryer for 75 seconds at 375° F. (190.6° C.), the resulting Aw was 0.800 and the moisture was 33.06%. The finished french fry potatoes were stored in mylar, a polyethylene tetraphthlate, pouches at room temperature (70° F.).

RECONSTITUTION:

The finished potatoes were placed between two susceptor boards and microwaved for 45 seconds at high power. The result was a french fry potato with a crispy exterior and a soft interior texture.

While this invention has been described by reference to the specific operating examples, it is intended to be limited only by the scope of the appended claims.

What is claimed is:

1. A method for producing shelf-stable, intermediate-moisture, fried potatoes suitable for microwave reconstitution comprising the steps of:

(a) preparing strips of raw potatoes;

(b) blanching the raw potato strips in an infusion solution for at least 1 minute at a temperature of at least 200° F., the infusion solution containing at least 5% by weight sodium chloride and at least 12% by weight sugar and a weight ratio of sugar to sodium chloride of from 1:1 to 5:1, the blanching time being effective to infuse sodium chloride and sugar into said potato strips;

(c) draining and cooking the infused potato strips;

(d) drying the infused potato strips; thereafter, (e) frying the strips for a time and at a temperature sufficient to produce shelf stable, intermediate-moisture potato strips which have a water activity below 0.85 and a moisture content between 10 to 40% by weight and which are to be reconstituted by heating in a microwave oven;

(f) packaging the fried strips in moisture-impermeable packaging material; and (g) storing the packaged, intermediate-moisture potato strips without refrigeration or sterilization.

2. The method of claim 1, wherein the preparing step includes soaking the strips of raw potatoes in a solution containing at least 0.1% by weight sodium pyrophosphate.

3. The method of claim 1, wherein said infusion solution contains at least 0.1% by weight of one or more of propylene glycol, glycerol, potassium chloride, sodium nitrite, potassium sorbate, sorbitol, propylparaben and sodium pyrophosphate.

4. The method of claim 1, wherein said drying step includes heating said infused potato strips in an oven for at least 1 minute at a temperature of at least 200° F. and said frying step includes frying said infused potato strips for at least 30 seconds at a temperature of at least 350° F.

* * * * *